United States Patent [19]

Pearce

[11] Patent Number: 5,754,125
[45] Date of Patent: May 19, 1998

[54] AUTOMATIC VEHICLE LOCATION SYSTEMS

[75] Inventor: John Nicholas Pearce, Berks, Great Britain

[73] Assignee: MDSI Mobile Data Solutions (UK) Ltd., Cambridge, Great Britain

[21] Appl. No.: 545,690

[22] PCT Filed: May 6, 1994

[86] PCT No.: PCT/GB94/00981

§ 371 Date: Feb. 8, 1996

§ 102(e) Date: Feb. 8, 1996

[87] PCT Pub. No.: WO94/27265

PCT Pub. Date: Nov. 24, 1994

[30] Foreign Application Priority Data

May 6, 1993 [GB] United Kingdom ............ 9309318

[51] Int. Cl.⁶ .................................................. G08G 1/123
[52] U.S. Cl. .................. 340/989; 340/988; 340/992; 701/214
[58] Field of Search ................... 340/988, 989, 340/990, 991, 992, 993, 994, 961, 995; 342/457; 364/449.1; 701/207, 208, 213, 214

[56] References Cited

U.S. PATENT DOCUMENTS

| | | |
|---|---|---|
| 4,835,537 | 5/1989 | Manion ................... 340/961 |
| 5,307,277 | 4/1994 | Hirano .................... 340/988 |
| 5,444,444 | 8/1995 | Ross ....................... 340/994 |

FOREIGN PATENT DOCUMENTS

| | | |
|---|---|---|
| 0006448 | 8/1982 | European Pat. Off. . |
| 0 509 776 A2 | 4/1992 | European Pat. Off. . |
| 0 528 530 A1 | 7/1992 | European Pat. Off. . |
| 0 537 499 A1 | 9/1992 | European Pat. Off. . |
| 2 670 002 | 11/1990 | France . |
| 59-181752 | 10/1984 | Japan . |
| 59-181753 | 10/1984 | Japan . |
| 62-7230 | 1/1987 | Japan . |
| 1384940 | 2/1975 | United Kingdom . |
| 2 025 185 | 7/1979 | United Kingdom . |
| 2 155 720 | 9/1985 | United Kingdom . |
| 2 232 316 | 5/1989 | United Kingdom . |

*Primary Examiner*—Brent A. Swarthout
*Attorney, Agent, or Firm*—Quarles & Brady

[57] ABSTRACT

An automatic vehicle location center includes a control center and a plurality of mobile units. Each mobile unit is able to derive a current position from external radio signals. A prediction is responsive to this current position signal and to predicted motion of the mobile unit to derive a predicted position signal. The predicted and current positions signals are compared and the current position signal is transmitted to the control center in dependence on the result of the comparison. The control center has a predictor, similar to that in each mobile unit, responsive to the current position signal and to predicted motion of the mobile unit to derive a predicted position. This position data is only transmitted from a mobile unit to the control center if the predicted position signal differs significantly from the actual position.

12 Claims, 1 Drawing Sheet

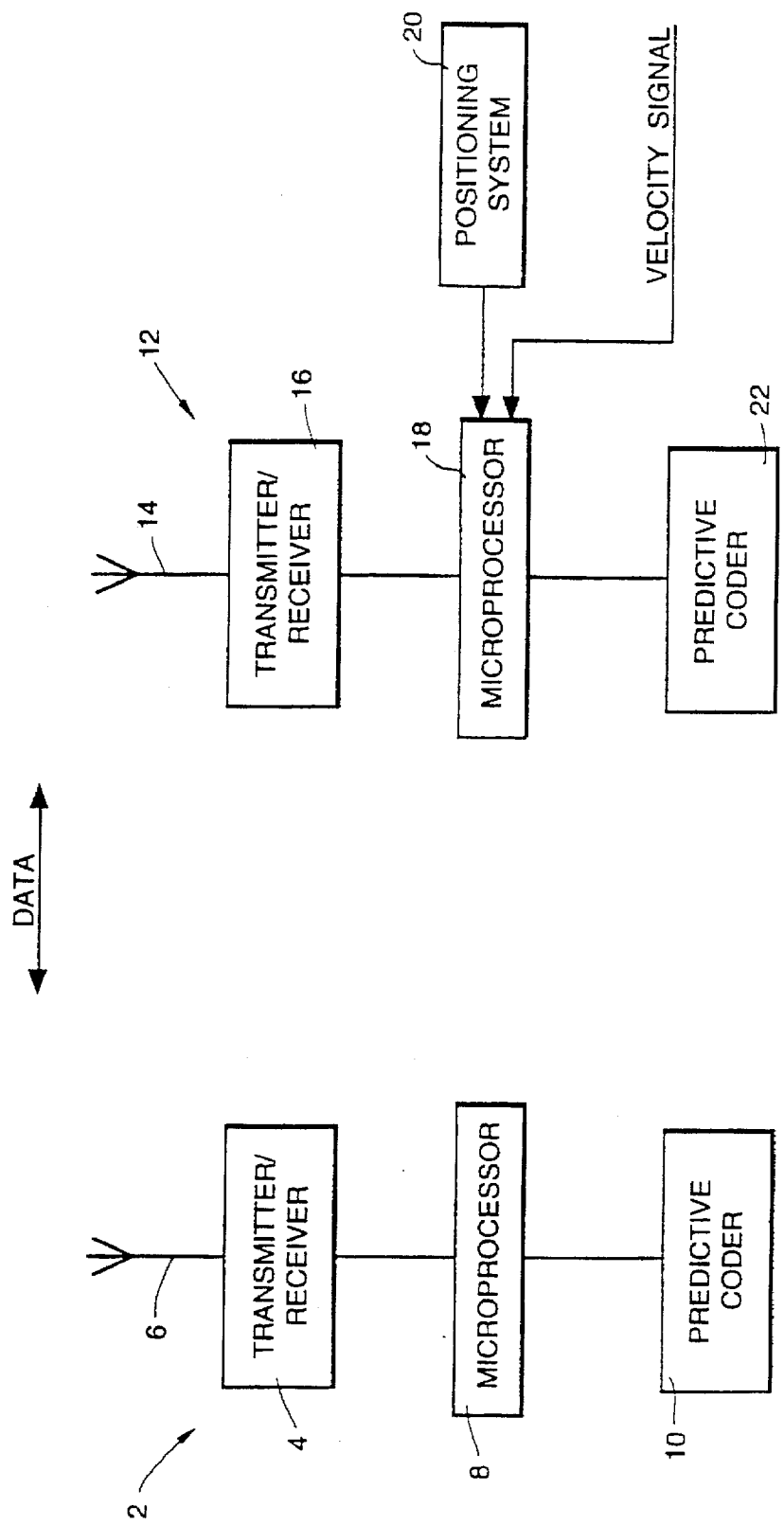

AUTOMATIC VEHICLE LOCATION SYSTEMS

FIELD OF THE INVENTION

This invention relates to automatic vehicle location systems of the type which may be used, for example, to monitor the locations of each of a plurality of mobile units such as a fleet of vehicles.

BACKGROUND OF THE INVENTION

A wide range of different basic techniques exist for automatic vehicle location. These include satellite based location systems such as, for example, the Omega system, and also systems which use local radio beacons. A mobile unit operating in one of these systems monitors phase differences in signals received from different satellites and uses these to derive the current position of the mobile unit. Typically a positional accuracy of approximately 100 meters may be obtained for a single derivation of position.

In a system comprising a central controller and a fleet of mobile units the positional information for each unit is required at the controller so that decisions relating to a mobile unit may be made, e.g. job allocation for taxis. In existing systems the information is transmitted to the controller by polling each mobile unit in the system for its position at regular intervals. In current systems the most frequent polling interval possible is generally fixed and is often as infrequent as once every 50 seconds, i.e. each mobile unit derives its position and transmits this information to the controller every 50 seconds.

Using such a polling system introduces an error in the data available at the controller and this error will vary with time elapsed since the last polling of a mobile unit for an update of its positional data. For example, a vehicle cruising at 120 kilometers per hour will travel 1666 meters in 50 seconds. Thus the average positional error at the controller will be slightly over 800 meters. Even if a vehicle is stuck in traffic at 25 kilometers per hour it will travel 347 meters in 50 seconds thus having an average positional error over the 50 second period of 173.5 meters. This error is, of course, in addition to the error in the originally derived position of the vehicle. Systems which have errors of this magnitude are not able to make best use of mobile units when allocating them to particular jobs.

Another disadvantage of systems which poll mobile units for their positions on a periodic basis is the amount of radio data communications traffic generated. This traffic can easily occupy most of the transmission time on a single radio channel and thus, if a significant number of vehicles are to receive data from the controller, more than one radio channel is required. Using current technology a single mobile radio channel might normally support approximately 100 vehicles without any vehicle location system in operation. A further two radio channels might very well be needed to carry the positional updating information from a vehicle location system provided in each mobile units if regular updates were to be produced once every 50 seconds.

SUMMARY OF THE INVENTION

Preferred embodiments of the present invention provide a system for automatic vehicle location which greatly increases the accuracy of positional information available by significantly reducing the errors in positional information which are inherent in a conventional polled vehicle location system. At the same time the amount of radio data communications traffic is significantly reduced.

This is achieved by providing both at the controller and at each mobile unit a predictive coder responsive to a position signal derived at the vehicle and to the vehicle's velocity (speed and direction) at the time that position signal was derived to derive a predicted position for the mobile unit. Thus the controller and each mobile unit have a predicted current position signal available to them.

At each mobile unit the predicted position signal derived by the predictive coder is compared with an actual position signal derived from the vehicle location unit. If the difference between the actual position signal and the predicted position signal exceeds a predetermined limit then the latest actual position signal and velocity are transmitted to the controller and used as a new seed input for the predictive coder. At the same time this latest actual position signal and velocity are also used as a new seed input to the predictive coder at the mobile unit.

The invention is defined in its various aspects in the appended claims to which reference should now be made.

BRIEF DESCRIPTION OF THE DRAWINGS

An embodiment of the invention will now be described in detail, by way of example, with reference to the single figure which shows a block diagram of circuitry provided at the controller and at a mobile unit.

DETAILED DESCRIPTION OF THE PREFERRED EMBODIMENTS

In the figure a controller 2 is shown which comprises a transmitter/receiver 4 coupled to an antenna 6. The transmitter/receiver is coupled to a microprocessor 8. Signals for mobile units are generated by the microprocessor 8 and are sent to the units by the transmitter/receiver 4 and the antenna 6. Signals from the mobile units are received, by the antenna 6 and the transmitter/receiver 4 and are then supplied to the microprocessor 8.

The microprocessor 8 is also coupled to a predictive coder 10. This receives a position and a velocity signal from the microprocessor and, using these, and a linear prediction technique supplies repeatedly updated predicted position signals to the microprocessor based on the originally supplied position and velocity signals and time elapsed since a mobile unit was last known to be at a particular position.

A mobile unit 12 comprises an antenna 14 coupled to a transmitter receiver 16 which is in turn coupled to a microprocessor 18. Data is sent to and received from the controller 2 via the transmitter receiver 16 and the antenna 14.

The mobile unit also comprises a location system responsive to signals from local beacons or from satellites or from any other form of location system to derive the position of the mobile unit. This is typically derived to within an accuracy of the order of 30 to 300 meters. The location system 20 repeatedly calculates the position of the mobile unit and supplies it to the microprocessors 18. The location system 20 updates the position signal sufficiently quickly for the microprocessor to, effectively, continuously monitor the position.

The microprocessor 18 is also supplied with a velocity signal derived from the speed and direction of the mobile unit.

A second predictive coder 22 is coupled to the microprocessor 18 and this is equivalent to the predictive coder 10 at the controller. Thus when fed with a position and a velocity signal the predictive coder 22 can derive a predicted position for the mobile unit based on a elapsed time since the position signal was generated.

In operation the mobile unit 12 initially derives its position using the location system 20. This is supplied to the microprocessor 18 which transmits it and the velocity signal of the mobile unit to the controller 2 via the transmitter receiver 16 and the antenna 14. At the control center the position signal and the velocity signal are fed to the predictive coder 10. At the same time the velocity signal and position signal are fed to the predictive coder 22 in the mobile unit 12. The predictive coders 10 and 22 then supply to their respective microprocessors 8 and 18 predicted position signals for the mobile unit based on elapsed time since the position and the velocity signals were generated. Thus at the controller position data is available based on the last known position and known velocity of a mobile unit.

At the mobile unit the microprocessor 18 continuously monitors the predicted position signal derived by the predictive coder and compares it with the current position signal derived by the location system 20. Providing the vehicle continues to move at an average velocity close to that initially fed to the predictive coder there will be little difference between the predicted position signal and the actual position signal. If, however, the mobile unit's velocity changes and it deviates from the path derived by the predictive coder the actual position and the predicted position will rapidly diverge. When the difference between the predicted position and actual position exceeds a predetermined amount the microprocessor 18 will cause a new actual position signal and velocity signal to be transmitted to the controller 2 to act as new seeds for the predictive coder 10. This updated position and velocity will also be fed to the predictive coder 22 at the mobile unit as new seeds. The same process will then continue.

Using such a system positional updates are sent from a mobile unit to the controller only when the mobile unit has deviated from the predicted path by more than a predetermined amount. In all other circumstances no positional update needs to be transmitted to the controller which, of course, has available to it a predicted position on which it may base any decisions relating to that mobile unit.

The update message sent from the mobile unit 12 to the controller 2 will typically be coded into a packet of data of, for example, 24 user characters. The nature of mobile data communication systems is such that for short messages the message duration is dominated by irreducible overheads and thus very little more radio air time is needed to send a message of 24 user characters than is needed to send a message purely containing location data. For this reason it is possible to send in the data packet data relating to the position, velocity, time to which the position data refers and, if desired, data relating to rates of change of speed or of direction. Using this additional data more complex predictive coding algorithms can be used to derive the predicted position of a mobile unit more accurately.

Because data messages are only sent from mobile units to the controller 2 when the difference between predicted and actual positions exceeds a predetermined amount the amount of radio traffic between mobile units and the control center is considerably reduced. For example, a parked vehicle will not send any update to the control center since its actual position and its predicted position will remain the same. A vehicle cruising on a motorway at a steady speed will only occasionally deviate from its predicted position by an amount in excess of the predetermined threshold (tolerable communications error) and will thus only occasionally require updated positional information to be sent to the controller.

By appropriately programming the microprocessor 18 in a mobile unit the unit can adapt the tolerable communications error in dependence on the actual location of the mobile unit. For example, when the mobile unit is within a dense city center a low threshold is required, for example, 50 to 100 meters. In less dense areas, e.g. rural areas, it is not necessary to have such an accurate estimation of the position of a mobile unit and a threshold of, for example, 300 to 500 meters would be appropriate.

Thus it can be seen that a vehicle location system which uses the system described above is able to operate with a reduced amount of radio traffic compared to a system which polls mobile units for their locations and furthermore the control center has available to it a more accurate estimation of the location of a mobile unit than with conventional polled systems.

I claim:

1. An automatic vehicle location system comprising a control center and a plurality of mobile units, each mobile unit comprising means for deriving a current position signal from external radio signals, prediction means responsive to a previously derived current position signal and to predicted motion of the mobile unit to derive a predicted position signal, means for comparing the current position signal with the predicted position signal and means for transmitting a positional update and a velocity signal to the control center in dependence on the result of the comparison, the control center comprising prediction means responsive to the positional update and the velocity signal to derive a predicted position signal for that mobile unit.

2. An automatic vehicle location system according to claim 1 in which each prediction means derives predicted motion for a mobile unit from the velocity signal and from time elapsed since derivation of the positional update signal last sent to the control center.

3. An automatic vehicle location system according to claim 2 in which each mobile unit further includes means for deriving a rate of change of speed signal from the motion of the mobile unit, said positional update includes the rate of change of speed signal, and the prediction means is also responsive to the rate of change of speed signal included in the positional update.

4. An automatic vehicle location system according to claim 2 in which each mobile unit further includes means for deriving a rate of change of direction signal, said positional update includes the rate of change of directional signal, and each prediction means is also responsive to the rate of change of direction signal.

5. An automatic vehicle location system according to claim 2 in which the positional update and velocity signal are transmitted from a mobile unit to the control center when the result of the comparison is that the difference between current and predicted signals exceeds a predetermined threshold.

6. An automatic vehicle location system according to claim 5 including means for altering the threshold.

7. An automatic vehicle location system according to claim 1 in which the control center prediction means is responsive to current position signals from and to predicted motion of each of the plurality of mobile units to derive a predicted position signal for each mobile unit.

8. An automatic vehicle location system according to claim 1 in which the positional update is a 24 character data packet.

9. An automatic vehicle location system according to claim 3 in which each mobile unit further includes means for deriving a rate of change of speed signal from the motion of the mobile unit, said positional update includes the rate of change of speed signal, and the prediction means is also responsive to the rate of change of speed signal included in the positional update.

10. An automatic vehicle location system according to claim 3 in which each mobile unit further includes means for deriving a rate of change of direction signal, said positional update included the rate of change of directional signal, and each prediction means is also responsive to rate of change of direction signal.

11. An automatic vehicle location system comprising a control center and a plurality of mobile units, each mobile unit comprising means for deriving a current position signal from external radio signals, prediction means responsive to a previously derived current position signal and to predicted motion of the mobile unit to derive a predicted position signal, means for comparing the current position signal with the predicted position signal and means for transmitting a positional update and a velocity signal to the control center in dependence on the result of the comparison, the control center comprising prediction means responsive to the positional update and the velocity signal to derive a predicted position signal for that mobile unit, in which each prediction means derives predicted motion for a mobile unit from the velocity signal and from time elapsed since derivation of the positional update signal last sent to the control center, and in which the positional update and velocity signal are transmitted from a mobile unit to the control center when the result of the comparison is that the difference between current and predicted signals exceeds a predetermined threshold;

said system further including means for altering the threshold, in which the threshold altering means is responsive to the current position signal to automatically alter the threshold.

12. A mobile unit for use in an automatic vehicle location system comprising means for deriving a current position signal, prediction means responsive to a previously derived current position signal and to a velocity signal from the mobile unit to derive a predicted postion signal for the mobile unit, means for comparing the current position signal with the predicted position signal, and means for transmitting a positional update and a velocity signal to a control center in dependence on the result of the comparison.

* * * * *